United States Patent [19]

Katagiri et al.

[11] Patent Number: 4,859,060
[45] Date of Patent: Aug. 22, 1989

[54] VARIABLE INTERFEROMETRIC DEVICE AND A PROCESS FOR THE PRODUCTION OF THE SAME

[75] Inventors: Masayuki Katagiri; Masanori Watanabe, both of Nara; Kazutaka Uda, Tenri; Masaya Hijikigawa, Yamatokoriyama; Shuhei Tsuchimoto; Yasuhiko Inami, both of Nara, all of Japan

[73] Assignee: 501 Sharp Kabushiki Kaisha, Osaka, Japan

[21] Appl. No.: 934,843

[22] Filed: Nov. 25, 1986

[30] Foreign Application Priority Data

| Nov. 26, 1985 | [JP] | Japan | 60-266680 |
| Dec. 18, 1985 | [JP] | Japan | 60-285959 |
| Apr. 30, 1986 | [JP] | Japan | 61-102989 |
| May 13, 1986 | [JP] | Japan | 61-110290 |

[51] Int. Cl.$^4$ .............................................. G01B 9/02
[52] U.S. Cl. ........................................ 356/352; 73/705
[58] Field of Search ................... 356/352, 345; 73/705

[56] References Cited

U.S. PATENT DOCUMENTS

| 3,902,012 | 8/1975 | Dalton et al. | 178/7.5 |
| 4,572,669 | 2/1986 | James et al. | 356/352 |
| 4,682,500 | 7/1987 | Uda | 356/352 X |

FOREIGN PATENT DOCUMENTS

| 0090456 | 5/1988 | European Pat. Off. |
| 2108439 | 7/1972 | Fed. Rep. of Germany |
| 3409207 | 9/1984 | Fed. Rep. of Germany |
| 312534 | 7/1928 | United Kingdom |
| 312534 | 5/1929 | United Kingdom |
| 1338646 | 2/1971 | United Kingdom |
| 1542627 | 5/1975 | United Kingdom |
| 1542627 | 3/1979 | United Kingdom |

OTHER PUBLICATIONS

Fellows et al., A Direct Digital Pressure Transducer, Conference: Advances in Instrumentation-Proceedings, of 24th Annual ISA Conference, Oct. 27–30, 1969, pp. 526, 1–7.

Aihara et al., A Simple Method for the Construction of Fabry–Perot Etalons, Japan, J. Appl. Phys., 6(1967), p. 536.

Baumeister, *Applied Optics & Optical Engineering*, Academic Press, vol. 1, p. 298, FIGURE 10, (1965).

*Primary Examiner*—Eugene R. Laroche
*Assistant Examiner*—Robert J. Pascal
*Attorney, Agent, or Firm*—Irell & Manella

[57] ABSTRACT

A variable interferometric device comprising a Fabry-Pérot interferometer composed of a pair of reflecting substances facing each other with a space therebetween formed by spacers and a means for deforming at least one of the reflecting substances constituting said Fabry-Pérot interferometer to thereby change the interferometric characteristics of said Fabry-Pérot interferometer. Moreover, an optical sensor comprising a light source, a first Fabry-Pérot interferometric device, the interferometric characteristics of which vary with the physical quantity of the object to be measured, a light-dividing means for dividing the light from the light source into a first light beam and a second light beam, a second Fabry-Pérot interferometric device functioning as a reference standard, the operational conditions of which are set at fixed values, a first photodetector for receiving the first light beam from said light-dividing means through the second Fabry-Pérot interferometric device, a second photodetector for receiving the second light beam from said light-dividing means through the second Fabry-Pérot interferometric device, and a signal-processing circuit for comparing the output signal from the first photodetector with the output signal from the second photodetector to thereby determine the physical quantity of the object to be measured.

18 Claims, 12 Drawing Sheets

4,859,060

VARIABLE INTERFEROMETRIC DEVICE AND A PROCESS FOR THE PRODUCTION OF THE SAME

BACKGROUND OF THE INVENTION

1. Field of the invention:

This invention relates to (1) a variable interferometric device, which comprises a Fabry-Pérot interferometer provided with a pair of substrates facing each other with a space therebetween, wherein the substrates are displaced by an external force so as to vary the interferometric characteristic of said interferometric device, (2) a process for the production of the variable interferometric device, and (3) a process for the control of the interferometric characteristics of the variable interferometric device. This invention further relates to an optical sensor using a variable interferometric device, the interferometric characteristics of which vary with external physical quantities.

2. Description of the prior art:

There are spectrometers provided with a diffraction grating. The diffraction grating is mechanically rotated, so that each of the optical elements of the spectrometers must be disposed with high precision, causing difficulties in the enlargement thereof.

On the other hand, Fabry-Pérot interferometric devices using a piezoelectric element therein can operate as a spectrometer that has no mechanical operating parts. The optical disposition of each element of the Fabry-Pérot interferometric device is easily performed, but the production of the interferometric devices and the control of the interferometric characteristics thereof are extremely difficult, which causes difficulties in the practical use thereof. FIG. 20 shows a conventional Fabry-Pérot variable interferometric device, in which a pair of transparent plates 500 and 501 are disposed in a parallel manner by means of a holder 502 provided with a hole 503 through which light beams pass. A reflecting film is coated on the surface of each of the plates 500 and 501 which face each other. A piezoelectric element 504 furnished with electrodes on both surfaces thereof is attached to the peripheral area of the plate 501, so that the piezoelectric element 504 expands and contracts depending upon the application of a driving voltage to the piezoelectric element 504, thereby allowing a variation in the distance between the plates 500 and 501 (i.e., the distance between the reflecting films). The variation in the distance between the reflecting films makes possible the changes in the interferometric characteristics of the device, so that the distance between the reflecting films must be set with strict precision and must be controlled with strict uniformity. Therefore, the holder 502 must be manufactured with extremely high accuracy, which causes difficulties in the production of a Fabry-Pérot interferometer. Moreover, due to the thermoexpansion of the holder 502 based on changes in temperatures in the atmosphere, there is a possibility that the distance between the reflecting films will vary. The control of the distance between the reflecting films by means of the piezoelectric element is also extremely difficult.

As mentioned above, in the conventional Fabry-Pérot interferometer device, the distance between the reflecting films depends upon the mechanical accuracy of the holder 502, which causes many problems.

Conventional optical sensors using a small-sized and inexpensive light source such as a light-emitting diode (LED), etc., are designed such that light from a light source, which can emit light with a relatively wide range of wavelengths, passes through a first Fabry-Pérot interferometric device, the characteristics of which vary with the physical quantity of the object to be measured, and through a second Fabry-Pérot interferometric device, the characteristics of which do not vary with the physical quantity of the object, and reaches a photodetector in which its optical intensity is changed into an electrical signal. Although the conventional optical sensors using two Fabry-Pérot interferometric devices detect physical quantities to be measured as a variation in the amount of light, the optical intensity at the photodetector varies with changes in light-emission intensity and/or scatter of connections losses arising when optical devices such as optical lenses, optical fibers, etc., are inserted into this optical measuring system, so that a stable-sensor output power can not be obtained by the conventional optical sensors.

SUMMARY OF THE INVENTION

The variable interferometric device of this invention, which overcomes the above-discussed and numerous other disadvantages and deficiencies of the prior art, comprises a Fabry-Pérot interferometer composed of a pair of reflecting substances facing each other with a space therebetween formed by spacers. The spacers are, in a preferred embodiment, a film formed by the vapor deposition method, the sputtering method, the chemical vapor deposition method, a spin coating technique, or a screen printing technique.

The variable interferometric device further comprises, in a preferred embodiment, a means for deforming at least one of the reflecting substances constituting said Fabry-Pérot interferometer to thereby change the interferometric characteristics of said Fabry-Pérot interferometer.

One of said reflecting substances is, in a preferred embodiment, replaced by a substrate on which a photodetector is formed, resulting in a single body structure incorporating said Fabry-Pérot interferometer and said photodetector into a single body.

The pair of reflecting substances are, in a preferred embodiment, joined to each other by sandwiching said spacers and adhesion layers made of low melting point glass between said reflecting substances, resulting in said Fabry-Pérot interferometer.

The means for deforming at least one of the reflecting substances produces, in a preferred embodiment, an electrostatic force between said pair of reflecting substances to thereby deform at least one of said reflecting substances. The reflecting substance is composed of a substrate and a thin electrode formed on said substrate, whereby at least one of said reflecting substances is deformed by an electrostatic force produced by the application of a voltage to said thin metal films, which causes a volume variation in the space, thereby attaining the determination of the interferometric characteristics of the Fabry-Pérot interferometer.

Alternatively, the means for deforming at least one of the reflecting substances produces a magnetic field in the vicinity of said pair of reflecting substances to thereby deform at least one of said reflecting substances. The means for producing a magnetic field is composed of a magnet coil for producing an electromagnetic force and a control circuit for controlling current, which flows through said coil, or voltage, which is applied to said coil, whereby at least one of said reflecting substances is deformed by an electromagnetic force produced by the application of current or voltage to said coil, which causes a volume variation in the space, thereby controlling the interferometric characteristics of the Fabry-Pérot interferometer.

The variable interferometric device of this invention, which also overcomes the above discussed and numerous other disadvantages and deficiencies of the prior art, comprises a Fabry-Pérot interferometer constituted by joining a first reflecting substance provided with a hollow in one surface thereof to a second reflecting substance, resulting in a space between said first and second reflecting substances.

The process for the production of an interferometric device of this invention, which overcomes the above-discussed and numerous other disadvantages and deficiencies of the prior art, comprises:

forming spacers and low melting glass films on at least one of a pair of reflecting substances constituting a Fabry-Pérot interferometer, subjecting said pair of reflecting substances to a pressing and heating treatment to join said reflecting substances to each other with a space therebetween formed by said spacers, and disposing an optical system, which applies light to said reflecting substances and which detects the reflected light or the transmitted light from said reflecting substances, and a means, which changes the interferometric characteristics of said interferometer.

In a preferred embodiment, the low melting glass film contains at least $SiO_2$ and PbO and has a softening point ranging from 350° C. to 480° C., said glass film being formed by the sputtering method or the vapor deposition method.

The process for the production of an interferometric device, which also overcomes the abovediscussed and numerous other disadvantages and deficiencies of the prior art, comprises:

forming an electrode film on the surface of a first reflecting substance and conductor or semiconductor films on the surface of a second reflecting substance, heating said first and second reflecting substances at a temperature below the melting point of said reflecting substances in such a manner that said conductor or semiconductor films on said second reflecting substance are in contact with said first reflecting substance, applying a DC voltage between said electrode film on the first reflecting substance and said conductor or semiconductor films on the second reflecting substance, thereby joining said first and second reflecting substances to each other with a space, resulting in a Fabry-Pérot interferometer, and disposing an optical system, which applies light to said reflecting substances and which detects the reflected light or the transmitted light from said reflecting substances, and a means, which changes the interferometric characteristics of said interferometer.

In a preferred embodiment, the conductor or semiconductor films function not only as an electrode, but also as a spacer by which said first and second reflecting substances are joined with a space therebetween formed by said conductor or semiconductor films.

Besides, the optical sensor of this invention, which overcomes the above-discussed and numerous disadvantages and deficiencies of the prior art, comprises a light source, a first Fabry-Pérot interferometric device, the interferometric characteristics of which vary with the physical quantity of the object to be measured, a light-dividing means for dividing the light from the light source into a first light beam and a second light beam, a second Fabry-Pérot interferometric device functioning as a reference standard, the operation conditions of which are set at fixed values, a first photodetector for receiving the first light beam from said light-dividing means through the second Fabry-Pérot interferometric device, a second photodetector for receiving the second light beam from said light-dividing means through the second Fabry-Pérot interferometric device, and a signal-processing circuit for comparing the output signal from the first photodetector with the output signal from the second photodetector to thereby determine the physical quantity of the object to be measured.

In a preferred embodiment, the angle at which said first light beam is incident on said second Fabry-Pérot interferometric device is different from the angle at which said second light beam is incident on said second Fabry-Pérot interferometric device.

In a preferred embodiment, the interferometric characteristics in the region of said second Fabry-Pérot interferometric device, through which the first light beam passes, are different from those in the region of said second Fabry-Pérot interferometric device, through which the second light beam passes.

The optical sensor of this invention, which also overcomes the above-discussed and numerous other disadvantages and deficiencies of the prior art, comprises, a light source, a first Fabry-Pérot interferometric device, the interferometric characteristics of which vary with the physical quantity of the object to be measured, a light-dividing means for dividing the light from the light source into a first light beam and a second light beam, second and third Fabry-Pérot interferometric devices functioning as a reference standard, the operational conditions of which are set at fixed values, a first photodetector for receiving the first light beam from said light-dividing means through the second Fabry-Pérot interferometric device, a second photodetector for receiving the second light beam from said light-dividing means through the third Fabry-Pérot interferometric device, and a signalprocessing circuit for comparing the output signal from the first photodetector with the output signal from the second photodetector to thereby determine the physical quantity of the object to be measured.

Thus, the invention described herein makes possible the objects of (1) providing a variable interferometric device having a Fabry-Pérot interferometer in which the optical path length varies by means of a simple mechanism to thereby change the interferometric characteristics thereof; (2) providing a high precision interferometric device which is readily manufactured and is superior in productivity; (3) providing a high precision interferometric device the interferometric characteristics of which are easily controllable with high accuracy; (4) providing a miniaturized spectrometer which contains no mechanical operating parts; and (5) providing a high precision optical sensor which can detect physical quantities in an enlarged dynamic range by the use of a variable interferometric device.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

EXAMPLE 1

Figure 1:
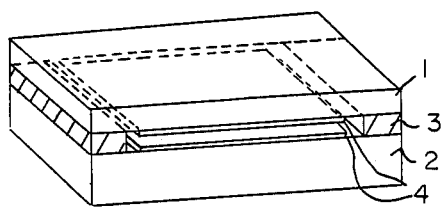
FIG. 1 is a perspective view showing a Fabry-Pérot interferometer, which is the main component of a variable interferometric device of this invention.

FIG. 1 shows a Fabry-Pérot interferometer, which is the main component of a variable interferometric device of this invention, wherein a pair of transparent substrates 1 and 2 face each other with a space therebetween formed by spacers 3. A reflecting film 4 is disposed on the surface of each of the substrates 1 and 2. The space between the reflecting films 4 constitutes a Fabry-Pérot interferometer. The space between the reflecting films 4 is occupied by a medium such as gas, liquid or solid, which is freely deformed. In this example and other examples described herein, air is used as the medium. The features of this structure of the Fabry-Pérot interferometer are as follows: First, this if of a hollow structure, which allows a great variation in the space between the reflecting films 4, that is, the detection of physical quantities in the enlarged dynamic range is possible. Secondly, the space between the reflecting films 4 depends upon the thickness of the spacers 3. That is, when the thickness of the spacers 3 is controlled with high precision, the interferometer can be set with high precision. Thirdly, the Fabry-Pérot interferometer is of a single body construction, which allows an improvement of stability and reliability of the interferometer even under unfavorable conditions such as vibration, impulse, etc., and which allows simple manipulation thereof and an enlarged usage. Fourthly, the Fabry-Pérot interferometer can be produced without a holder, which allows a miniaturization thereof.

The spacer 3 is constituted by, for example, a fibrous substance such as glass fiber, a spherical substance such as a glass sphere, or a filmy substance. Especially, a thin film, which is formed by a thin film formation technique such as the vapor deposition method, the sputtering method, the chemical vapor deposition method, etc., or a thick film, which is formed by a spin coating technique or a screen printing technique, is preferable because of superiority in productivity and thickness controllability. The transparent substrate, which must be a plate with an excellent surface smoothness, is made of glass, transparent ceramic, resin, etc. Especially, a glass substrate is preferable because of excellence in transparency and surface smoothness. The Fabry-Pérot interferometer provided with such a structure is advantageous in that it can attain an improved productivity and miniaturization, as mentioned above.

The fundamental operation principle of the variable interferometric device is as follows: Given that light is vertically applied to the surface of the substrate and that optical phase skips do not arise in the reflecting films, when the distance between the reflecting films is t and the refractive index of the medium existing between the reflecting films is n, the Fabry-Pérot spectral transmittance $T(\lambda)$ becomes maximum at the value of the wavelength $\lambda m$ that is represented by the formula (1):

$$\lambda m = 2nt/m \ (m=1, 2, 3,...) \qquad (1)$$

If the inside of the interferometer of this invention is hollow (namely, the medium in the space between the reflecting films is air), the refractive index is about 1, so that the wavelength of light passing through the interferometer depends upon the distance t between the reflecting films. This means that when a means for deforming at least one of the transparent substrates of the Fabry-Pérot interferometer shown in FIG. 1 is attached to this interferometer, the interferometric characteristics of this interferometer can be changed, resulting in a variable interferometric device. By the control of the distance t between the reflecting films this variable interferometric device can be used as a spectrometer by which the selected wavelength of the transmitted light can be observed. Moreover, this variable interferometric device can be used as an optical sensor in which the distance t between the reflecting films is changed by external physical quantities, whereby the physical quantities can be determined.

EXAMPLE 2

Figure 2:
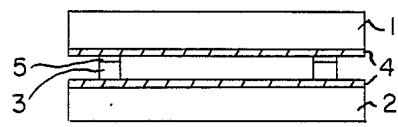
FIGS. 2 and 3 are schematic diagrams showing a production process of the interferometer shown in FIG. 1.
Figure 3:
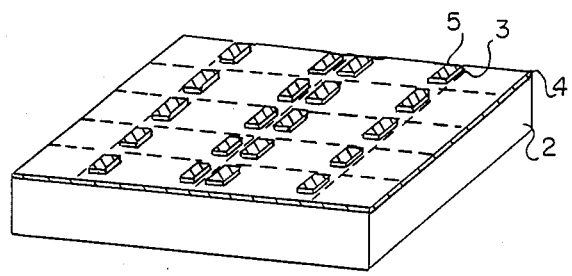

A production process of the Fabry-Pérot interferometer mentioned in Example 1 is described below with reference to FIGS. 2 and 3. A reflecting film 4 made of a metal film or a mono-layered or multilayered dielectric film is formed on the surface of the glass substrate 2, which has excellent flatness and an excellent surface smoothness. On the reflecting film 4, an Al film is formed by the vapor deposition method. Instead of the vapor deposition method, the sputtering method or the chemical vapor deposition method can be applied. The Al film is then subjected to a patterning treatment by a photolithographic process and subjected to an etching treatment by an etching technique, resulting in patterned spacers 3. On each spacer 3, a glass film 5 having a low melting point (the softening point thereof ranging from 350' C. to 480° C.) is then formed by the sputtering method. The vapor deposition method or the chemical vapor deposition method can be used, instead. The glass film 5 contains $SiO_2$ and PbO. It is undesirable that the glass film 5 is formed on the portions of the reflecting film 4 in which light is transmitted and the optical interference arises, because it affects the optical characteristics of the resulting interferometer. In order to eliminate these troubles, a metal mask is used and the glass film is prevented from being disposed on the portions other than the spacer 3 during the sputtering process. The thickness of the glass film 5 is preferably to be 0.1 $\mu$m or more.

Figure 4:
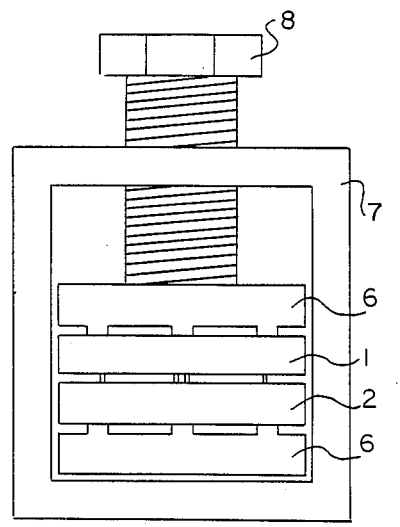
FIG. 4 is a side view showing a holder used in the production process shown in FIGS. 2 and 3.

Then, on the other glass substrate 1, a reflecting film 4 is formed in the same manner as the above-mentioned. The glass substrate 1 and 2 are held by the process mentioned below in such a manner that the reflecting films 4 formed on the glass substrates 1 and 2 face each other, and then heated and pressed at about 500° C. for 3. minutes. The glass film 5 having a low melting point is melted and functions as an adhesive for joining one of the glass substrates to the other. The glass substrates 1 and 2 are held at a given position by the following process: It is preferable that the glass substrates 1 and 2 to be joined have an area which is large enough to receive a plurality of units as shown in FIG. 3, so that a uniform pressure can be easily applied to the glass substrates and a plurality of units can be produced at the same time, which allows an improvement of productivity of the interferometer. FIG. 4 shows a holder for holding the glass substrates 1 and 2 at a given position, in which the glass substrates 1 and 2 are sandwiched between the aluminum blocks 6 having protrusions at the positions corresponding to the spacers 3 so that only the portions of the glass substrates corresponding to the spacers 3 can be pressed. The aluminum blocks 6 are fixed to a stainless holder body 7 by a stainless screw 8. The thermal expansion coefficient of both the stainless holder body 7 and the stainless screw 8 is about $18 \times 10^{-6}/$°C. and the thermal expansion coefficient of the aluminum blocks 6 is about $28 \times 10^{-6}/$°C. A suitable pressure based on the difference in the thermal expansion coefficient therebetween is applied to the glass substrates 1 and 2 when the glass substrates 1 and 2 are heated at about 500° C. in the state where they are held by the aluminum blocks 6. When the reflecting films 4 are made of a metal film the heating step is carried out in an inert atmosphere such as $N_2$ gas etc., if necessary, so as to prevent the oxidization of the reflecting films 4. Although the spacer 3 was made of Al in this example, the use of a thin film made of other metals, semiconductor substances or dielectric substances is, of course, possible. Moreover, the spacers 3 were formed on only one of the two substrates, but it is possible for the spacers to be formed on both substrates and the spacers facing each other be joined to each other so as to combine the two substrate.

According to the production process mentioned above, a Fabry-Pérot interferometer with a single body construction can be obtained by a thin film formation technique, which achieves a ready control of the distance between the reflecting films and which makes possible a batch processing to thereby attain the massproduction of units.

EXAMPLE 3

Another production process of the Fabry-Pérot interferometer used in a variable interferometric device of this invention is described below with reference to FIGS. 5(a) and 5(b).

Figure 5A:
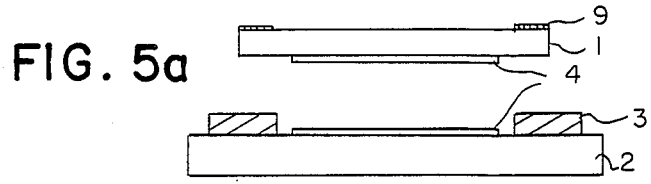
FIGS. 5(a) and 5(b) are schematic diagrams showing a production process of another interferometer used in a variable interferometric device of this invention.

As shown in FIG. 5(a), a reflecting film 4 is formed on one surface of a transparent substrate 1 such as a glass substrate, and metal films 9 functioning as electrodes are formed on the other surface of the glass substrate 1. On a transparent substrate 2, spacers 3 made of a conductor or semiconductor substance such as Si, Al, Fe, etc., which are readily oxidized, and a reflecting film 4 are formed by a thin film formation technique such as the vapor deposition method, for sputtering method, the chemical vapor deposition method, etc.

Figure 5B:
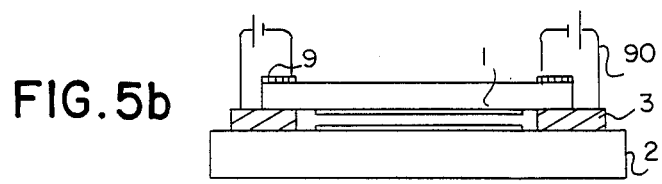

As shown in FIG. 5(b), the glass substrate 1 is placed on the spacers 3 formed on the substrate 2. The spacers 3 and the electrodes 9 are connected to a DC power source by metal wires 90 in such a manner that the spacers 3 are connected to the anode and the electrodes 9 are connected to the cathode. Then, both are heated at a temperature which will soften the glass (ordinarily, 800° C. or less) while a DC voltage (ordinarily ranging from 200 to 2000 V/1 mm of the thickness of the glass) is applied, thereby attaining the joining of the spacers 3 made of a conductor or semiconductor substance to the glass substrate 1. In this example, the spacers 3 function not only as an adhesive for joining the substrate 1 to the substrate 2 but also as a spacer for controlling the distance between the substrates 1 and 2. The conductor or semiconductor substance is necessary to join the substrate 1 to the substrate 2, and it can be independent of a spacing substance. For example, a spacing substance (e.g., a thin film) is formed on the substrate 2 and then a conductor or semiconductor film is disposed on the spacing film, and thereafter, a voltage is applied between the conductor or semiconductor film and an electrode formed on the substrate 1 in the same manner as mentioned above, thereby attaining the joining of the substrate 1 to the substrate 2 by the conductor or semiconductor film. The distance between the reflecting films 4 depends upon the total thicknesses of the spacing film and the conductor or semiconductor film. The spacing film is, of course, sufficiently thicker than the conductor or semiconductor film. Needles to say, an adhesive substance and a spacing substance can be separately used instead of the above-mentioned spacers 3.

EXAMPLE 4

Figure 6:
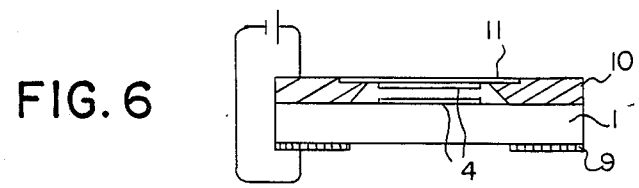
FIG. 6 is a side view showing another interferometer used in a variable interferometric device of this invention.

FIG. 6 shows another Fabry-Pérot interferometer, which is produced as follows: A transparent $SiO_2$ film 11 is formed on a part of one surface of a Si substrate 10 by a heat-oxidization technique, the vacuum vapor deposition method, the sputtering method, the chemical vapor deposition method, etc. On the other surface, of the Si substrate 10, a photo-mask is disposed and patterned so as to prevent the Si substrate 10 from being excessively etched in the succeeding etching process. Then, the Si substrate 10 is subjected to an etching treatment by a chemical etching technique (e.g., a crystal isotrophy or anisotrophy etching) so as to expose a part of the SiO$_2$ film 11, resulting in a fine diaphragm structure. Then, the photo-mask is removed from the Si substrate 10 and a reflecting film 4 is formed on the exposed SiO$_2$ film 11. On the other hand, a metal film 9 functioning as an electrode and a reflecting film 4, respectively, are formed on the upper and lower surfaces of the transparent substrate 1, respectively. Thereafter, the Si substrate 10 is joined to the transparent substrate 1 in the same manner as in Example 3. Then, the Si substrate 10 is connected to the anode and the metal film 9 on the transparent substrate 1 is connected to the cathode, and a DC voltage is applied to the substrates 10 and the metal film 9 at a given temperature. To hold the substrates, the holder shown in FIG. 4 is preferably used. The interferometer of this example is also produced using a thin film formation process, so that the spacing between the reflecting films 4 can be set depending upon the thickness of the thin film used as a spacer. Moreover, since the spacer is not deformed in the joining step of the substrates 10 and 1, the spacing between the reflecting films 4 can be readily controlled with high precision. The interferometer can be produced by a batch process, as well.

EXAMPLE 5

A variable interferometric device, which controls the interferometric characteristics of the Fabry-Pérot interferometer by changing the distance between the reflecting films of the Fabry-Pérot interferometer, is described below: Given that light is incident vertically on the surface of the substrate and optical phase skips do not arise in the reflecting films, in order to transmit light having a selected single wavelength in the scanning wavelength region ranging from $\lambda_1$ to $\lambda_2$, the distance t between the reflecting films must be controlled within the following range; $\lambda_1/2n \leq t \leq \lambda_2/2n$, as seen from the formula (1). The wavelength of the transmitted light is 2nt when the distance between the reflecting films is t, wherein n is the refractive index of the medium within the interferometer. If the medium is air, n is about 1. When the scanning wavelength region is in the range, for example, of 400 of 750 nm, the distance t between the reflecting films is controllable between 200 nm and 375 nm.

Figure 7A:
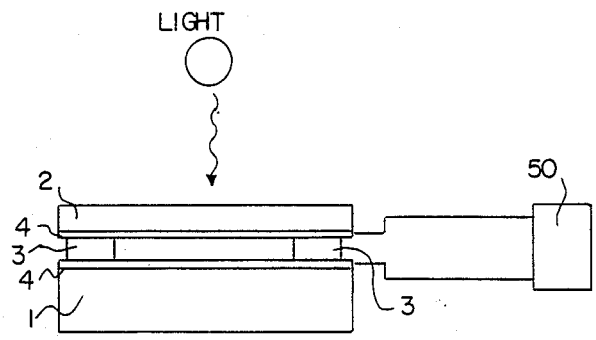
FIG. 7(a) is a side view showing a variable interferometric device of this invention.

FIG. 7(a) shows a variable interferometric device of this invention, which is produced as follows: Reflecting material films 4 made of Ag, Al, Au, or the like are formed on the substrates 1 and 2 by the vapor deposition method. The substrates 1 and 2 are joined facing each other with a space therebetween by the spacers 3, in such a manner that the reflecting films 4 face each other, resulting in a hollow type Fabry-Pérot interferometric device. The reflecting metal films 4 also function as electrodes, which are connected to a power source 50. As mentioned above, the interferometric device is designed such that electrodes formed on the facing surfaces of the substrates constitute a space (i.e., a hollow) therebetween and that the space is deformed by electrostatic force arising between the electrodes. Although the reflecting films 4 also serve as electrodes in this example, the reflecting films are fundamentally independent of the electrodes.

Figure 7B:
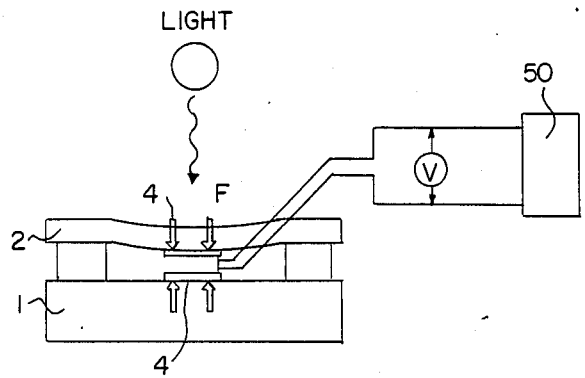
FIG. 7(b) is a schematic diagram showing the state in which the distance between the reflecting films of the interferometric device shown in FIG. 7(a) is shortened.

A method for scanning the wavelength of light is described below: As shown in FIG.7(b), the glass substrate 2 is supported at both ends thereof by the spacers 3, but the center of the substrate 2 is not supported by the spacers 3, so that the substrate 2 can be bent by the application of force to the center of the substrate 2, which causes a change in the distance t between the reflecting films 4. Given that $t_0$ is the distance therebetween when the force is not applied to the substrate 2, t can be represented by the formula: $t = t_0 - \alpha F$, wherein $\alpha$ is the changed value of t per a unit force. In this example, $\alpha = 1.6 \mu m/Kgf$.

The scanning range of the wavelength of light attained by the variable interferometric device of this invention can be calculated as follows when the above-mentioned force applied to the substrate 2 is an electrostatic force: Provided that the electrodes 4 exist only in the narrow area of the substrates 1 and 2 positioned between the spacers 3, the distance t between the electrodes 4 can be considered to be equal over the whole area of these electrodes 4, which makes the following calculation easy.

The force F is represented by the formula (2) when the electrode area is S and the applied voltage is V:

$$F = \tfrac{1}{2}QE, \qquad (2)$$

wherein Q=CV (Q is the amount of electric charge), C=$\epsilon$S/d (C is the electrostatic capacitance), and E=V/t (E is the electric field strength).

Since the space between the electrodes is occupied by air, a vacuum dielectric constant $\epsilon_0$ is used as the dielectric constant $\epsilon$ and the formula (2) can be represented by the formula (3):

$$F = \tfrac{1}{2}\epsilon_0 S(V/t)^2. \qquad (3)$$

Figure 8:
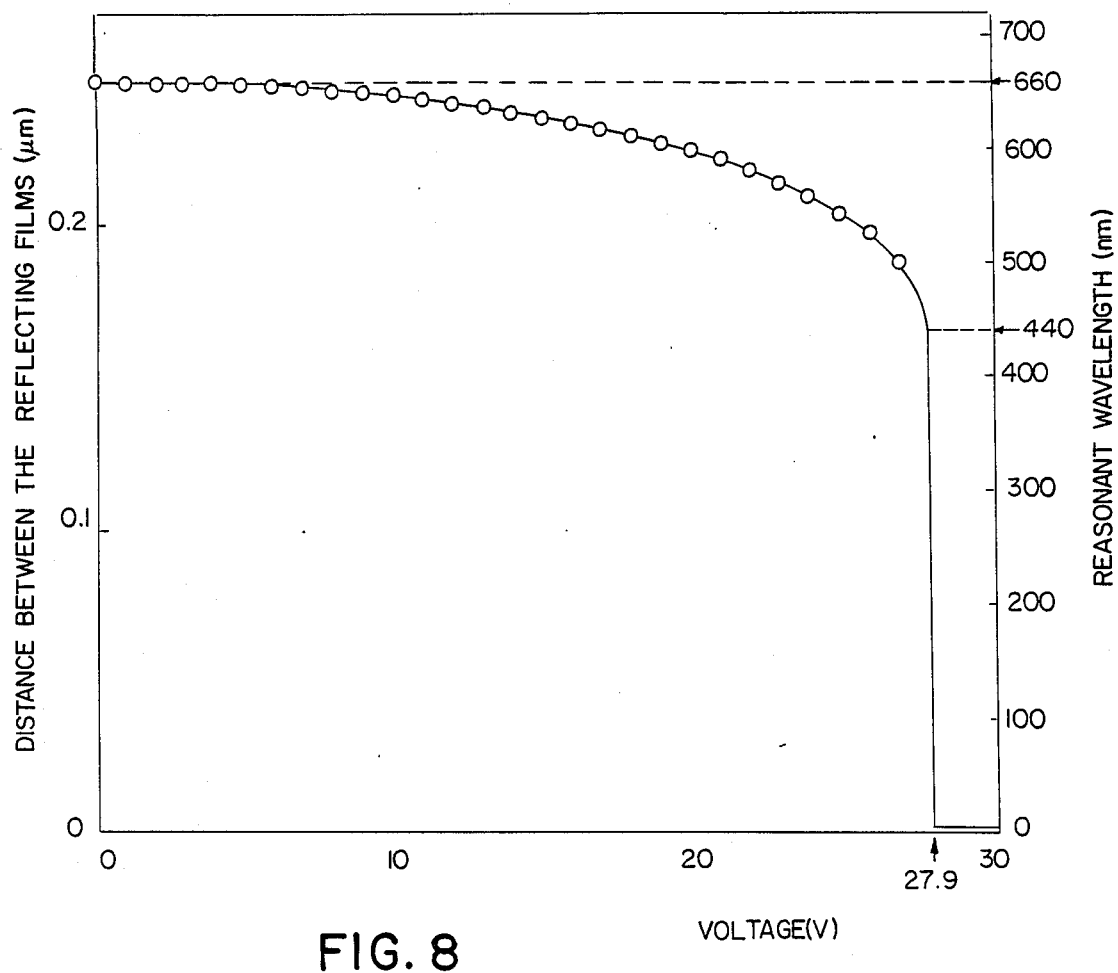
FIG. 8 is a characteristic curve showing the interferometric characteristics of the interferometric device shown in FIG. 7(a).

When S=4 mm$^2$, $\alpha = 1.6 \mu m/Kgf$, and t ranges from 0.2475 $\mu m$ to 0.188 $\mu m$, the calculation results are shown in FIG. 8, which indicates that the scanning of the wavelength ranging from 660 to 440 nm can be carried out. In this example, since a metal film was used as the reflecting films 4 and moreover the optical phase skips arising at the light reflection on the reflecting films 4 were taken into consideration, the spectral transmittance of the interferometric device does not meet the formula (1). However, the distance t between the electrodes 4 and the wavelength $\lambda$ of the transmitted light has a linear relationship. FIG. 8 also indicates that a discontinuous change in the distance t arises at 27.9 V. This is due to the phenomenon that when the voltage is higher than 27.9 V, the distance t becomes smaller so that the electrostatic force F becomes larger, which progressively makes the distance t smaller, Thus, the operation voltage must not be beyond 27.9 V, wherein t is changed from $t_0$ to $2t_0/3$.

Materials that are useful as the reflecting film are described below:

Wavelength resolution of the reflecting film depends upon the reflectance of the reflecting film. For example, the resolution is about 20 nm when the reflectance of the reflecting film is 90% and the wavelength of light to be transmitted by the reflecting film is 550 nm, and the resolution can be improved by an increase in the reflectance. The reflectance can be set to be 99% or more in a limited wavelength region by the use of a multi-layered dielectric film. However, in order to maintain the reflectance at a fixed level in an enlarged wavelength region, a reflecting metal film is more preferable than such a multi-layered dielectric reflecting film.

In general, optical loss arises in reflecting metal films. The optical loss is smaller as the reflectance of the reflecting metal film is higher. Metals having a high reflectance in the visible region (i.e., 400-700 nm) are Ag (its reflectance being 98%), Al (its reflectance being 92%), etc. Moreover, metals having a high reflectance in the near-infrared region (i.e., 700-1600 nm) or the infrared region (i.e., below 10 μm) are Ag (its reflectance being 99%), Au (its reflectance being 98%), etc. These metals are excellent in conductivity, so that they can also function as electrodes to which voltage is applied so as to produce electrostatic force therebetween.

When the variable interferometric device is used in a small range of wavelength, for example, 540-560 nm, is adapted, a multi-layered dielectric film made of TiO$_5$, SiO$_2$, ZnS, MgF$_2$, etc., can be used as the reflecting film. Since the maximum reflectance of this reflecting film can be set to be 99% or more, a spectrometer having a high wavelength-resolution is obtainable. The dielectric reflecting film has no conductivity, and electrodes must be disposed independently.

Figure 9A:
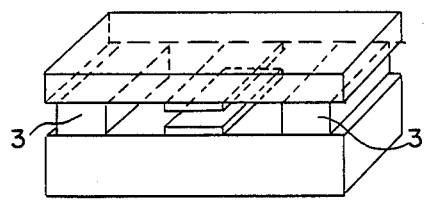
FIG. 9(a) is a perspective view showing a part of the interferometric devices shown in FIG. 7(b).
Figure 9B:
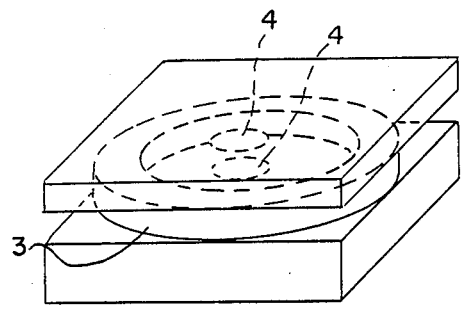
FIGS. 9(b) and 9(c) are perspective views showing a part of another variable interferometric device of this invention.
Figure 9C:
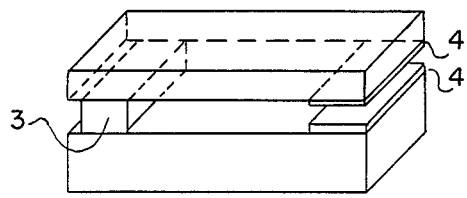

The variable interferometric device of this invention can be modified as desired. FIG. 9(a) shows a perspective view of the variable interferometric device of this example shown in FIG. 7(b), which is advantageous in that the configuration is simple, thereby, making the design easy. FIG. 9(b) shows a modification in which a doughnut spacer 3 is used. FIG. 9(c) shows another modification in which only one spacer 3 is used on one end of the substrate. This single spacer structure is suitable to a low-voltage application operation because the distance t between the reflecting films is changed in the wide range when voltage is applied to the reflecting films.

EXAMPLE 6

Figure 10:
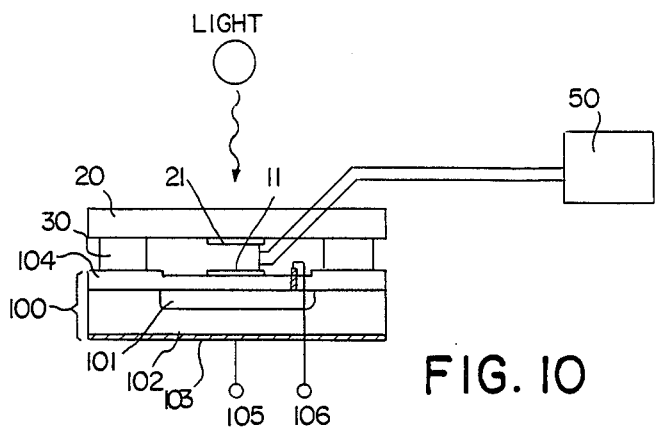
FIG. 10 is a sectional side view showing another variable interferometric device of this invention.

FIG. 10 shows another variable interferometric device of this invention, in which a photodetector such as a Si photodiode 100 is incorporated into the variable interferometric device forming a single body. The Si photodiode 100 is produced as follows: A p-diffusion layer 101 is formed in an n-substrate 102, using a SiO$_2$ layer 104 as a mask, and a bottom electrode 103 is formed on the back face of the substrate 102. The cathode electrode 105 and the anode electrode 106 are connected to the bottom electrode 103 and the diffusion layer 101, respectively, resulting in the Si photodiode 100.

An Ag film 11 functioning as both the reflecting film and the electrode is formed on the Si photodiode 100 by the vapor deposition method, Then, a glass substrate 20 having an Ag thin film 21 is joined to the Si photodiode 100 with a space therebetween by means of spacers 30 in such a manner that the Ag film 21 faces the Ag film 11. In this way, the photodetector and the variable interferometric device are incorporated into a single body, so that they can be conveniently handled as a single photodetector by which wavelength selection can be carried out. As the photodetector, a Si phototransistor, an a-Si solar cell, a compound semiconductor photodiode made of GaAs, etc., can be employed. As mentioned above, the variable interferometric device of this invention includes a built-in driving mechanism, by which the substrates are deformed, within the Fabry-Pérot interferometer, resulting in a simple structure.

EXAMPLE 7

Figure 11:
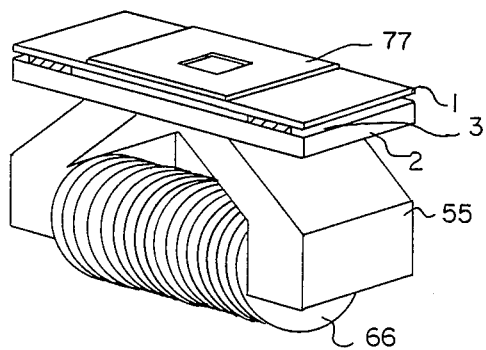
FIG. 11 is a perspective view showing another variable interferometric device of this invention.
Figure 12:
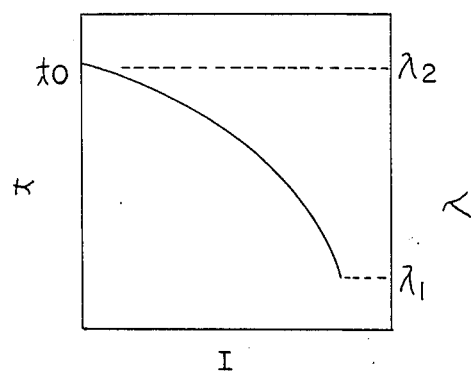
FIG. 12 is a characteristic curve showing the interferometric characteristics of the device shown in FIG. 11.

FIG. 11 shows another variable interferometric device of this invention, in which the interferometer constituted by transparent substrates 1 and 2 are sandwiched between the magnetic substance 77 provided with a hole through which light passes and an electromagnet composed of a magnet core 55 and a coil 66. The magnetic substance 77, which is preferably formed into a thin sheet, is made of malleable iron, permalloy, etc., having a high magnetic permeability. The interferometer and the electromagnet are fixed by a holder (not shown). When current flows through the coil 66, the force F represented by the formula (4) arises between the magnet core 55 and the magnetic substance 77:

$$F = N^2I^2/\mu_0 SQ^2, \quad (4)$$

wherein $\mu_0$ is the magnetic permeability under vacuum, N is the number of turns of the coil, I is the current, S is the area of the magnetic pole, and Q is the magnetic resistance. The force F, which is proportional to the square of current I, attracts the magnetic substance 77 to the magnetic core 55 to thereby press the interferometer to the magnet core 55, so that the transparent substrates 1 and 2 are bent, causing the changes in the distance t between the reflecting films FIG. 12 indicates that the distance t between the reflecting films varies depending upon the current passing through the coil 66 so that the peak wavelength of the transmitted light in the interferometer can be scanned.

EXAMPLE 8

Figure 13:
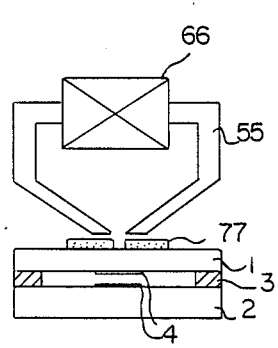
FIG. 13 is a sectional side view showing another variable interferometric device of this invention.

FIG. 13 shows another variable interferometric device of this invention, in which a magnetic substance 77 provided with a hole through which light passes is fixed to the transparent substrate 1. A magnetic core 55 is fixed to the interferometric device at a slight distance (0.1 mm or less) from the magnetic substance 77. The coil 66 is disposed with a gradient so as to allow the application of light to the transparent substrate 1. When current flows through the coil 66, an electric magnet force arises in the magnet core 55 and attracts the magnetic substance 77 to the magnet core 55, so that the transparent substrate 1 is bent. In this example, the distance t between the reflecting films increases with an increase in the current.

EXAMPLE 9

Figure 14:
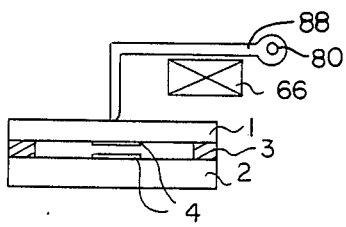
FIG. 14 is a sectional side view showing another variable interferometric device of this invention.

FIG. 14 shows another variable interferometric device of this invention, in which one end of a magnetic substance 88 that is rotatable around the other end 80 is in contact with the transparent substrate 1. A coil 66 is disposed in the position at which the magnetic substance 88 can be attracted. The magnetic substance 88 is free from the coil 66 when current does not flow through the coil 66. When current flows through the coil 66, the magnetic substance 88 is attracted to the coil 66 to thereby press the transparent substrate 1. It is not essential for the magnetic substance 88 to be rotatable around its end 80, but it is better for the magnetic substance 88 to be positioned as near the coil 66 as possible so that the attractive force can develop between the coil 66 and the magnetic substance 88. It is also possible that the magnetic substance is fixed. If a permanent magnet is combined with the electric magnet in the above examples, an effective driving system will be obtained. Moreover, as shown in FIG. 10, a photodetector such as a Si photodiode, etc., and the variable interferometric device can be incorporated into a single body.

The magnetic substance 88 is, of course, disposed such that it does not prevent the application of light to the transparent substrate 1. Alternatively, the magnetic substance 88 is furnished with a hole through which light passes.

The interferometric device of this invention is designed such that the optical path length of the Fabry-Pérot interferometer with a single body structure is controlled by a driving system, so that the control can be carried out with high precision and stability. Moreover, no complicated components are used and attachments that are in contact with the interferometer are light-weight, so that the interferometer operates stably without damage even under unfavorable conditions such as vibration and/or impulse. Thus, this invention provides a miniaturized variable interferometric device having a spectroscopic function.

EXAMPLE 10

Figure 15:
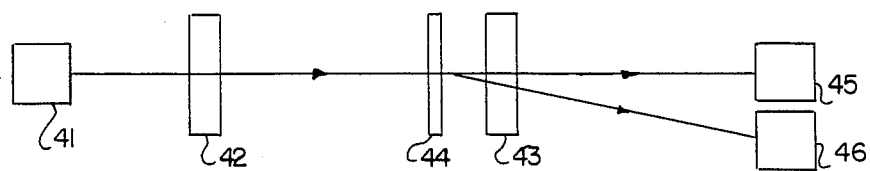
FIG. 15 is a schematic diagram showing an optical sensor of this invention.

FIG. 15 shows an optical sensor provided with Fabry-Pérot interferometric devices which comprises a light-emitted diode 41, a first Fabry-Pérot interferometric device 42, the characteristics of which vary with the physical quantity of the object to be measured, a diffraction grating 44 for dividing the light from the light-emitting diode 41 into a plurality of light beams, the zero order light of which is directed vertically to a second Fabry-Pérot interferometric device 43 and the first order light of which is directed obliquely to the second Fabry-Pérot interferometric device 43, a photodiode 45 for receiving the transmitted zero order light from the second Fabry-Pérot interferometric device 43, a photodiode 46 for receiving transmitted first order light from the second Fabry-Pérot interferometric device 43, and a signalprocessing circuit (not shown) for comparing the output signal from the photodiode 45 with the output signal from the photodiode 46.

Instead of the light-emitting diode 41, a variety of light sources such as white light sources, e.g., a halogen lamp, producing light with a wide spectral band width, can be used. The diffraction grating 44 produces an inclined incident light and a vertical incident light at the same time, and instead, other means such as the combination of a half mirror with a prism can be used to produce a plurality of light beams with different incidences therebetween. The light from the light source is preferably led to the photodetectors by optical fibers. The light from each of the Fabry-Pérot interferometric devices 42 and 43 is not necessarily a transmitted light, but it can be, of course, a reflected light therefrom.

In this example, two kinds of light beam having different incidences are led to the second Fabry-Pérot interferometric device 43. This provides the second Fabry-Pérot interferometric device 43 equivalently with two different optical path lengths. In general, the effective optical path length for the interference in a Fabry-Pérot interferometric device is $nt\cdot\cos\theta$, wherein n is the refractive index of the medium between the reflecting films facing each other, t is the distance between the reflecting films, and $\theta$ is the incidence of light to the reflecting films. In this example, the refractive index n of the medium is nearly 1 and the incidence of light, $\theta ex$, to the Fabry-Pérot interferometric device is equal to the incidence of light, $\theta$, to the reflecting films.

The incidence of light, $\theta ex$, to the Fabry-Pérot interferometric device was set such that the difference between the effective optical path length at a vertical incidence, nt, and the effective optical path length at an oblique incidence, $nt\cdot\cos\theta$, meets the formula (5):

$$nt(1-\cos\theta)=\lambda_O/8, \tag{5}$$

wherein $\lambda_P$ is the central wavelength of the light-emitting diode 41.

As mentioned above, $n-1$, and $\theta ex=\theta$. When t and $\lambda_O$, respectively, were set to be 12 μm and 850 nm, $\theta ex$ was calculated to be 7.6° and the diffraction grating 44 was produced such that the first diffracted light is directed with an angle of 7.6° to the Fabry-Pérot interferometric device 43.

Figure 16:
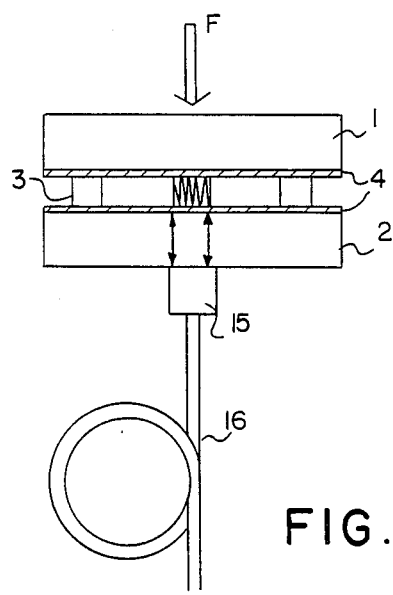
FIG. 16 is a schematic diagram showing a first Fabry-Pérot interferometer of the optical sensor shown in FIG. 15.

The optical sensor with the above-mentioned structure detects the physical quantities by which the optical path length of the first Fabry-Pérot interferometric device 42 is changed. The first Fabry-Pérot interferometric device 42 is provided with a structure, as shown in FIG. 16, that a pair of glass substrates 1 and 2 are joined with a space therebetween formed by spacers 3 in a manner to face the reflecting films 4 disposed on said glass substrates 1 and 2. The reflecting film 4 was made of a metal film, but it can be made of a single-layered dielectric film or a multilayered dielectric film. When an external force F (a contact pressure or a load) is applied to one of the glass substrates 1 and 2, the glass substrate 1 is bent to thereby vary the internal optical path length, which causes changes in the interferometric characteristics of the first Fabry-Pérot interferometric device 42. The first Fabry-Pérot interferometric device 42 is not of a permeation type, but it is of a reflection type. That is, as shown in FIG. 16, light was led to and from the first Fabry-Pérot interferometric device 42 by using an optical fiber 16 and a microlens 15.

The second Fabry-Pérot interferometric device 43 is provided with the same structure as the first Fabry-Pérot interferometric device 42, except that it is of a permeation type.

Figure 17A:
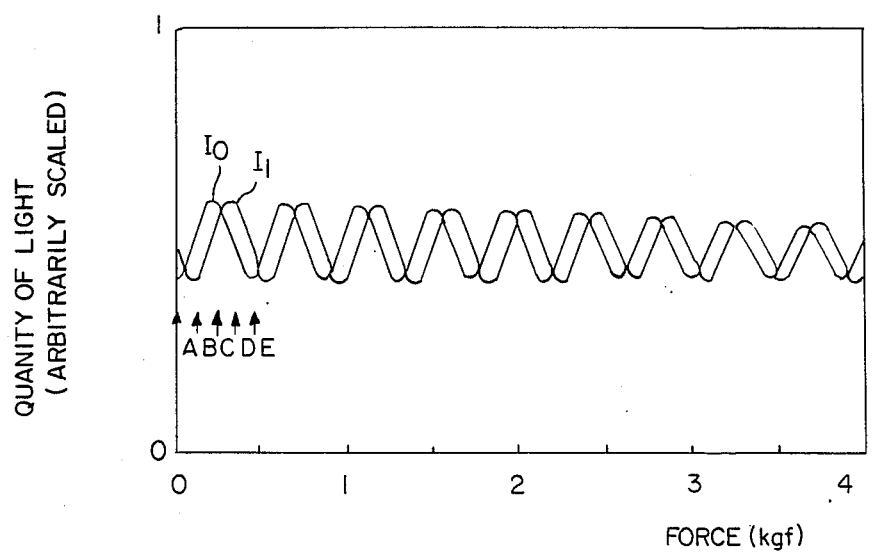
FIGS. 17(a) and 17(b) are characteristic curves showing the output power characteristics of the optical sensor showing in FIG. 15.
Figure 17B:
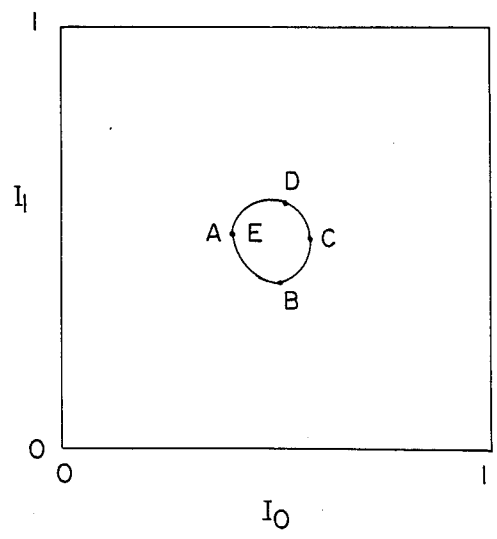

FIG. 17(a) shows output powers of the optical sensor of this example when the optical sensor was used as a stress sensor, wherein $I_0$ and $I_1$, respectively, are the output powers of the photodiodes 45 and 46 shown in FIG. 15. $I_1$ is shifted from $I_0$ by only a ¼ cycle, and accordingly when the output powers $I_0$ and $I_1$ are plotted on the axis of abscissa and the axis of ordinate, respectively, the curve shown in FIG. 17(b) can be obtained. FIG. 17(b) shows the changes in output power $I_0$ in one cycle from arrow marks A to E shown in FIG. 17(a). When the applied force changes from C to A, the output power $I_0$ changes from the maximum value to the minimum value. When the applied force changes from C to E, the output power $I_0$ changes in the same manner as the above-mentioned. Thus, when the value of $I_0$ alone was detected, it is impossible to determine an increase or decrease in the applied force. Therefore, when the output power $I_1$ based on an oblique incident light to the second Fabry-Pérot interferometric device is taken into consideration, it can be determined from the graph shown in FIG. 17(b) as to whether the applied force increases or decreases. That is, when the applied force is changed from C to A through B (i.e., C→B→A) in a clockwise direction, it can be seen that the force decreases, whereas it can be seen that the force increases when it is changed from C to E through D (i.e., C→D→E) in a counterclockwise direction. In this way, by continuously tracing the changes in the quantities of light, $I_0$ and $I_1$, the value of the applied force or the physical quantity can be continuously traced.

In the above-mentioned formula (5), the difference in the effective optical path length of the Fabry-Pérot interferometric device between the two light beams was set to be $\lambda_0/8$. This is because $I_0$ and $I_1$ are set to be shifted from each other by a ¼ cycle. When $I_1$ is shifted from $I_0$ by a ¼ cycle, the curve shown in FIG. 17(b) becomes round, so that the movement of the points indicating values of $I_0$ and $I_1$ in FIG. 17(b) can be easily traced.

EXAMPLE 11

Figure 18:
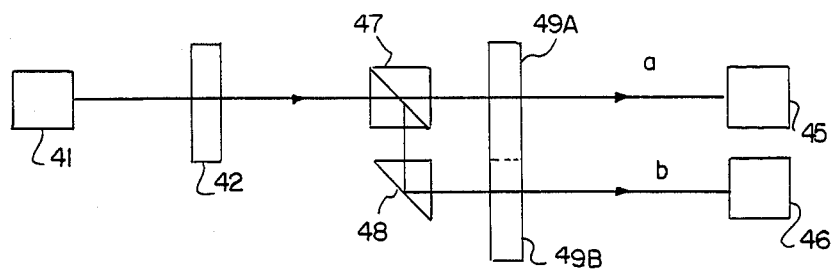
FIG. 18 is a schematic diagram showing another optical sensor of this invention.

FIG. 18 shows another optical sensor of this invention, which comprises a light-emitting diode 41, a first Fabry-Pérot interferometric device 42, the characteristics of which vary with the physical quantity of the object to be measured, a light-driving means (including a beam splitter 47 and a prism 48) for dividing the light from the light-emitting diode 41 into two parallel light beams, one (a) of which is directed to the region 49A of a second Fabry-Pérot interferometric device 49 and the other (b) of which is directed to the region 49B of the second Fabry-Pérot interferometric device 49, a photodiode 45 for receiving the transmitted light from the region 49A of the interferometric device 49, a photodiode 46 for receiving the transmitted light from the region 49B of the interferometric device 49, and a signal-processing circuit (not shown) for comparing the output signal from the photodiode 45 with the output signal from the photodiode 46. Each element of this system can be replaced by others in the same manner as in Example 10.

Figure 19:
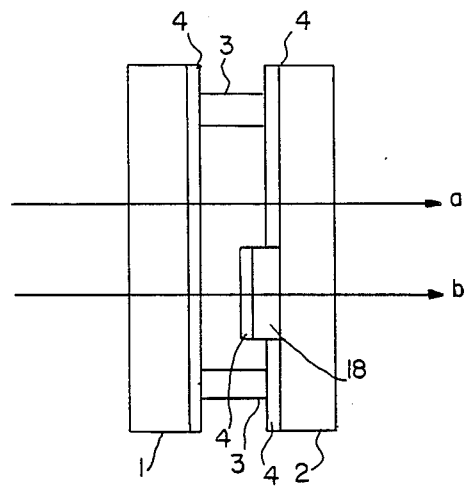
FIG. 19 is schematic diagram showing a second Fabry-Pérot interferometer of the optical sensor shown in FIG. 18.
Figure 20:
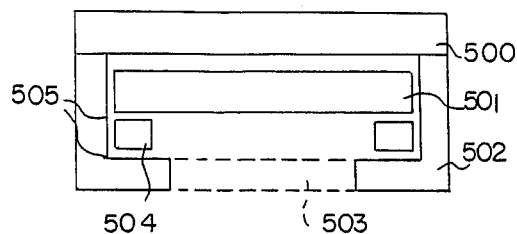
FIG. 20 is a side view showing a conventional Fabry-Pérot variable interferometric device provided with a piezoelectric element.

The first Fabry-Pérot interferometric device 42 used in this example is of a reflection type, which is the same as that of Example 10 shown in FIG. 15. The second Fabry-Pérot interferometric device 49 is designed, as shown in FIG. 19, such that a glass plate 1 having a reflecting film 4 is joined to a glass plate 2 having a $SiO_2$ film (the thickness thereof being $\lambda_0/8$) 18 on a part of the surface thereof and having a reflecting film 4, with a space therebetween formed by spacers 3. The light beam (a) passes through the region 49A in which the $SiO_2$ film 18 is not formed on the glass plate 2, and the light beam (b) passes through the region 49B in which the $SiO_2$ film 18 is formed on the glass plate 2. When the effective optical path length of the Fabry-Pérot interferometric device 49 with regard to the light beam (a) is t, the effective optical path length with regard to the light beam (b) is $(t-\lambda_0/8)$. As mentioned in Example 10, given that optical output powers of the two light beams, passing through the regions 49A and 49B of the second Fabry-Pérot interferometric device 49 in which the difference between the internal optical path lengths is $\lambda_0/8$, are $I_0$ and $I_1$, when the changes in the two output powers are detected, the changes in the internal optical path length of the first Fabry-Pérot interferometric device 42 can be determined. In fact, the output characteristics of the optical sensor of this example were the same as those of Example 10 shown in FIGS. 17(a) and 17(b).

Elements corresponding to the regions 49A and 49B, respectively, of the second Fabry-Pérot interferometric device 49 can be separately disposed in the above-mentioned system. In this case, the freedom of disposition of each of the elements increases, so that, for example, an optical path-changing element such as the prism 48 can be omitted.

In Examples 10 and 11, when a portion of the light beam from the first Fabry-Pérot interferometric device is directed to the photodetectors 45 and 46 and the output powers produced by the photodetectors 45 and 46 are standardized as a reference standard, the fluctuations of the quantity of light from a light source and/or the fluctuations of loss of the quantity of light are eliminated, resulting in stable output power. Although both the first and the second Fabry-Pérot interferometric devices are of a hollow type in Examples 10 and 11, they can be of different types. For example, the first Fabry-Pérot interferometric device can be designed such that the optical path length nt of the medium inside of the interferometer can be changed by the physical quantity of the object to be measured, and the second Fabry-Pérot interferometric device can have a hollow type structure. Moreover, the Fabry-Pérot interferometric device can be a fiber Fabry-Pérot interferometric device, which is produced by cutting a single-mode optical fiber into a given length, both ends of which are provided with reflecting mirrors, as desired, formed by a known reflecting processing.

The optical sensor having the above-mentioned structure of this invention is, of course, applicable to a dynamic sensor (such as a pressure sensor, a sound sensor, a vibration sensor, a load sensor, etc.), which detects dynamic quantities, using the Fabry-Pérot interferometric device, the inside of which is hollow.

Moreover if the Fabry-Pérot interferometric device is designed to have a variable distance between the reflecting films based on a variation in other physical quantities such as electricity, magnetism, etc., any kind of physical quantity can be detected.

As mentioned above, the features of the optical sensor of this invention are that two independent signals are produced from only one kind of light passing through a first Fabry-Pérot interferometric device by means of an extremely simple structure, and accordingly the physical quantity of the object to be measured can be detected in a wide dynamic range corresponding to a variation in the light quantities extending over many cycles. Thus, a wide dynamic ranged optical sensor can be obtained with ease and high precision, which is of extremely practical value.

According to this invention, as mentioned above, a Fabry-Pérot interferometer, which is required to have high mechanical precision and which is the main part of a variable interferometric device, is mainly composed of a pair of substrates facing each other with a space therebetween formed by spacers and is produced using a thin film formation technique, so that the producibility of the variable interferometric device can be improved and the interferometric characteristics of the variable interferometric device can be easily controlled. Fundamentally, the control of the interferometric characteristics is carried out by deforming the substrates used in the interferometer, using an external electric signal, whereby excellent control of precision, stability and reproducibility can be achieved. A miniaturized spectrometer having no mechanical driving parts can be obtained using this variable interferometric device. Moreover, this invention provides an optical sensor, wherein the interferometric characteristics of a Fabry-Pérot interferometer are changed based on an external physical quantity so as to modulate an optical signal and the modulated signal light is divided into two light beams, which are then directed to different interferometer, respectively, to thereby detect the physical quantity in the wide dynamic range of the object to be measured.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A variable interferometric device comprising a Fabry-Pérot interferometer including a pair of reflecting substances facing each other with a space therebetween formed by spacers, wherein one of said reflecting substances is replaced by a substrate on which a photodetector is formed, resulting in a single body structure incorporating said Fabry-Pérot interferometer and said photodetector into a single body.

2. A variable interferometric device comprising a Fabry-Pérot interferometer including a pair of reflecting substances facing each other with a space therebetween formed by spacers and a means for deforming at least one of the reflecting substances constituting said Fabry-Pérot interferometer to thereby change the interferometric characteristics of said Fabry-Pérot interferometer, wherein said means for deforming at least one of the reflecting substances produces an electrostatic force between said pair of reflecting substances to thereby deform at least one of said reflecting substances.

3. A variable interferometric device comprising a Fabry-Pérot interferometer including a pair of reflecting substances facing each other with a space therebetween formed by spacers and a means for deforming at least one of the reflecting substances constituting said Fabry-Pérot interferometer to thereby change the interferometric characteristics of said Fabry-Pérot interferometer, wherein said means for deforming at least one of the reflecting substances produces an electrostatic force between said pair of reflecting substances to thereby deform at least one of said reflecting substances,
wherein each of said reflecting substances is composed of a substrate and a thin electrode formed on said substrate, whereby at least one of said reflecting substances is deformed by an electrostatic force produced by the application of a voltage of said thin metal films, which causes a volume variation in the space, the volume of which determines the interferometric characteristics of the Fabry-Pérot interferometer.

4. A variable interferometric device comprising a Fabry-Pérot interferometer including a pair of reflecting substances facing each other with a space therebetween formed by spacers and a means for deforming at least one of the reflecting substances constituting said Fabry-Pérot interferometer to thereby change the interferometric characteristics of said Fabry-Pérot interferometer, wherein said means for deforming at least one of the reflecting substances produces a magnetic field in the vicinity of said pair of reflecting substances to thereby deform at least one of said reflecting substances.

5. A variable interferometric device comprising a Fabry-Pérot interferometer including a pair of reflecting substances facing each other with a space therebetween formed by spacers and a means for deforming at least one of the reflecting substances constituting said Fabry-Pérot interferometer to thereby change the interferometric characteristics of said Fabry-Pérot interferometer, wherein said means for deforming at least one of the reflecting substances produces an electrostatic force between said pair of reflecting substances to thereby deform at least one of said reflecting substances, wherein said means for deforming at least one of the reflected substances produces a magnetic field in the vicinity of said pair of reflecting substances to thereby deform at least one of said reflecting substances,
wherein said means for deforming at least one of the reflecting substances comprises
a magnet coil for producing an electromagnetic force and
a control circuit for controlling current, which flows through said coil, or voltage, which is applied to said coil,
whereby at least one of said reflecting substances is deformed by an electromagnetic force produced by the application of current or voltage to said coil which causes a variation in the space, thereby controlling the interferometric characteristics of the Fabry-Pérot interferometer.

6. A variable interferometric device comprising a Fabry-Pérot interferometer constituted by joining a first reflecting substance to a second reflecting substance, said first reflecting substance being provided with a hollow in a surface thereof facing said second reflecting substance, resulting in a space formed by said hollow between said first and second reflecting substances.

7. A process for the production of an interferometric device comprising:
forming spacers and low melting point glass films on at least one of a pair of reflecting substances constituting a Fabry-Pérot interferometer,
subjecting said pair of reflecting substances to a pressing and heating treatment to join said reflecting substances to each other with a space therebetween formed by said spacers, and
disposing an optical system which applies light to said reflecting substances and which detects the light from said reflecting substances, and a means which changes the interferometric characteristics of said interferometer.

8. A process according to claim 11, wherein said low melting point glass films contain at least $SiO_2$ and PbO and have a softening point ranging from 350° to 480° C., said glass films being formed by the sputtering method.

9. A process according to claim 7, wherein said low melting point glass films comprise at least $SiO_2$ and PbO and have a softening point ranging from 350° to 480° C., said glass films being formed by the vapor deposition method.

10. A process for the production of an interferometric device comprising:
forming at least one electrode film on the surface of a first reflecting substance and conductor films on the surface of a second reflecting substance,
heating said first and second reflecting substances at a temperature below the melting point of said reflecting substances in such a manner that said conductor films are in contact with said first reflecting substance, applying a DC voltage between said electrode film and said conductor films, thereby joining said first and second reflecting substances to each other with a space therebetween, resulting in a Fabry-Pérot interferometer, and disposing an optical system which applies light to said reflecting substances and which detects the light from said reflecting substances, and a means which changes the interferometric characteristics of said interferometer.

11. A process according to claim 10, wherein said conductor films function not only as an electrode, but also as a spacer by which said first and second reflecting substances are joined with a space therebetween formed by said conductor films.

12. An optical sensor comprising a light source, a first Fabry-Pérot interferometric device, the interferometric characteristics of which vary with the physical quantity of the object to be measured, a light-dividing means for dividing the light from the light source into a first light beam and a second light beam, a second Fabry-Pérot interferometric device functioning as a reference standard, the operational conditions of which are set at fixed values, a first photodetector for receiving the first light beam from said light-dividing means through the second Fabry-Pérot interferometric device, a second photodetector for receiving the second light beam from said light dividing means through the second Fabry-Pérot interferometric device, and a signal-processing circuit for comparing the output signal from the second photodetector to thereby determine the physical quantity of the object to be measured.

13. An optical sensor according to claim 12, wherein the angle at which said first light beam is incident on said second Fabry-Pérot interferometric device is different from the angle at which said second light beam is incident on said second Fabry-Pérot interferometric device.

14. An optical sensor according to claim 12, wherein the interferometric characteristics in the region of said second Fabry-Pérot interferometric device, through which the first light beam passes, are different from those in the region of said second Fabry-Pérot interferometric device, through which the second light beam passes.

15. An optical sensor comprising a light source, a first Fabry-Pérot interferometric device, the interferometric characteristics of which vary with the physical quantity of the object to be measured, a light-dividing means for dividing the light from the light source into a first light beam and a second light beam, second and third Fabry-Pérot interferometric devices functioning as reference standards, the operational conditions of which are set at fixed values, a first photodetector for receiving the first light beam from said light-dividing means through the second Fabry-Pérot interferometric device, a second photodetector for receiving the second light beam from said light-dividing means through the third Fabry-Pérot interferometric device, and a signal-processing circuit for comparing the output signal from the first photodetector with the output signal from the second photodetector to thereby determine the physical quantity of the object to be measured.

16. A spectrometer comprising a Fabry-Pérot interferometer including a pair of reflecting substances facing each other with a space therebetween formed by spacers and a means for deforming at least one of the reflecting substances constituting said Fabry-Pérot interferometer to thereby change the interferometric characteristics of said Fabry-Pérot interferometer, wherein one of said reflecting substances is replaced by a substrate on which a photodetector is formed, resulting in a single body structure incorporating said Fabry-Pérot interferometer and said photodetector into a single body.

17. A process for the production of an interferometric device comprising:

forming at least one electrode film on the surface of a first reflecting substance and semiconductor films on the surface of a second reflecting substance, heating said first and second reflecting substances at a temperature below the melting point of said reflecting substances in such a manner that said semiconductor films are in contact with said first reflecting substance, applying a DC voltage between said electrode film and said semiconductor films thereby joining said first and second reflecting substances to each other with a space therebetween, resulting in a Fabry-Pérot interferometer, and disposing an optical system which applies light to said reflecting substances and which detects the light from said reflecting substances, and a means which changes the interferometric characteristics of said interferometer.

18. A process according to claim 17, wherein said semiconductor films function not only as an electrode, but also as a spacer by which said first and second reflecting substances are joined with a space therebetween formed by said semiconductor films.

* * * * *